E. HOWE.
CORN HARVESTER.
APPLICATION FILED NOV. 18, 1911.
1,031,004.
Patented July 2, 1912.
2 SHEETS—SHEET 1.
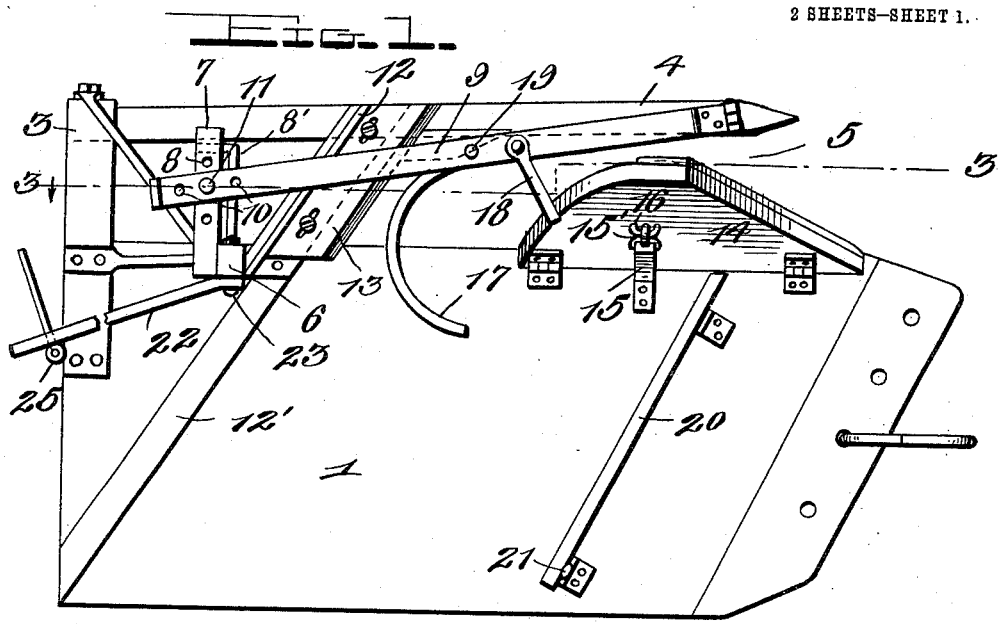
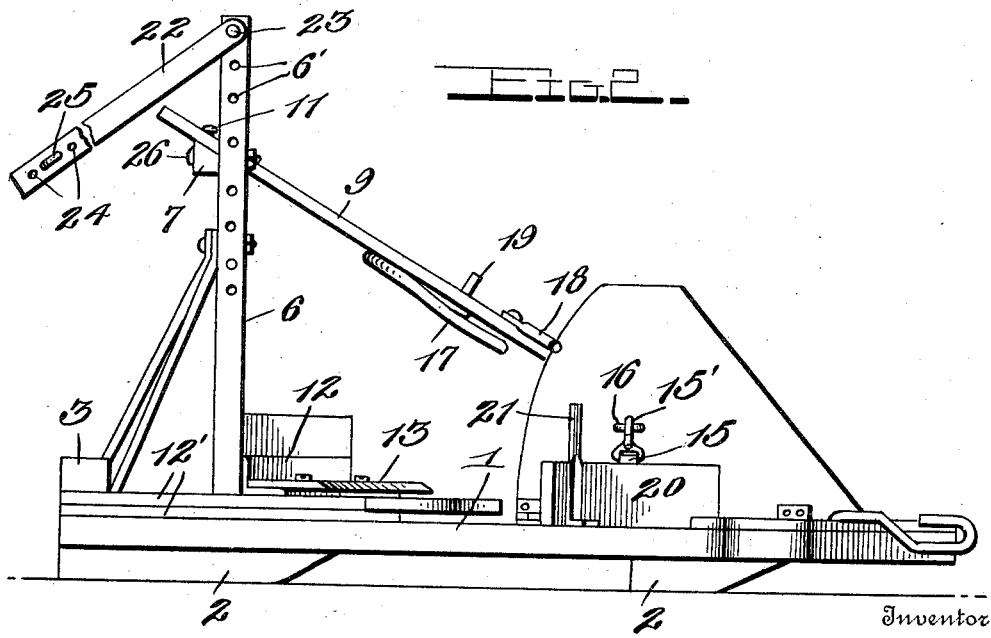
Witnesses
Chas. L. Griestauer.
L. G. Ellis.
Inventor
Edson Howe,
By Watson E. Coleman.
Attorney
COLUMBIA PLANOGRAPH CO., WASHINGTON, D. C.

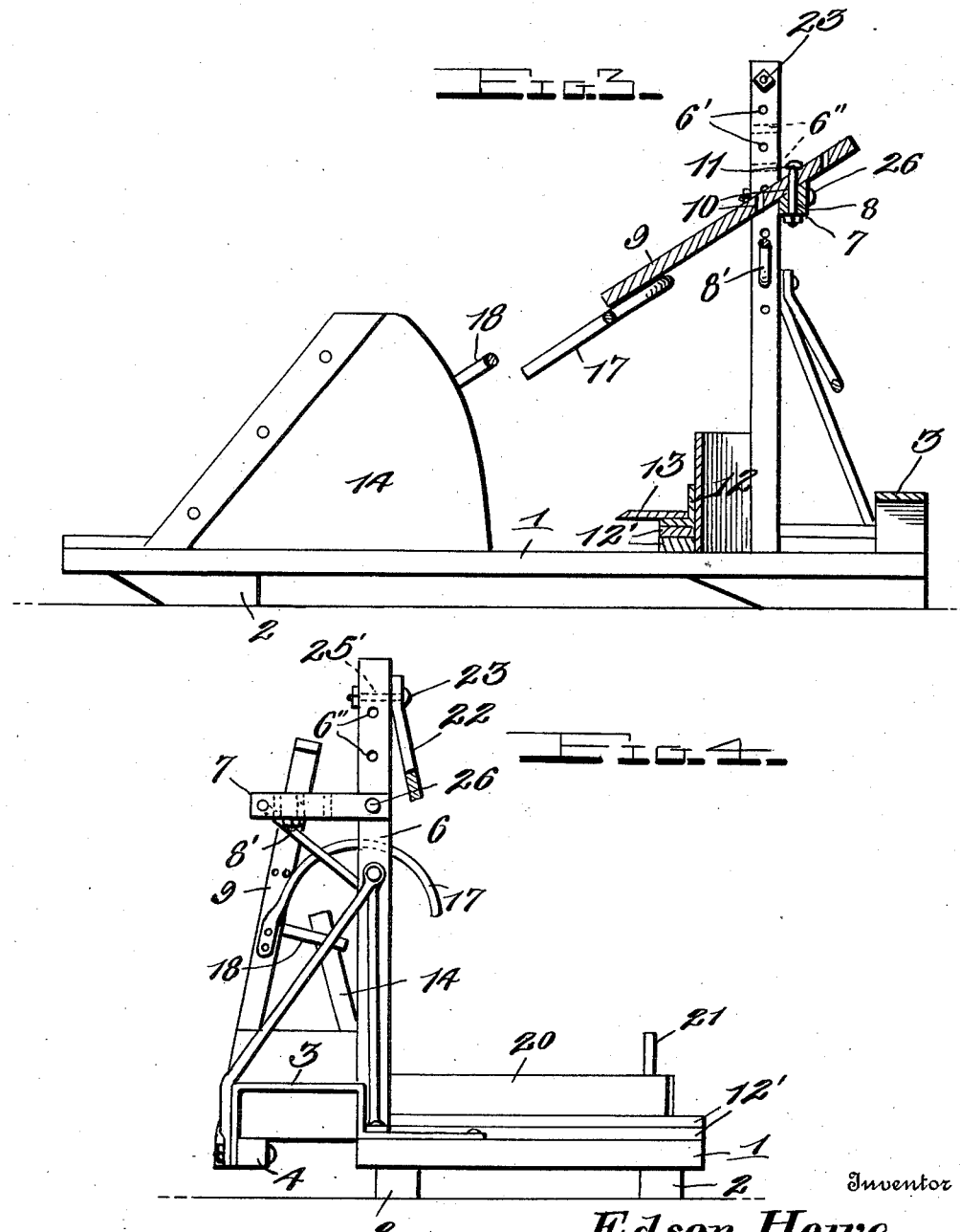

UNITED STATES PATENT OFFICE.

EDSON HOWE, OF MACON, MISSOURI.

CORN-HARVESTER.

1,031,004.    Specification of Letters Patent.    Patented July 2, 1912.

Application filed November 18, 1911. Serial No. 661,102.

*To all whom it may concern:*

Be it known that I, EDSON HOWE, a citizen of the United States, residing at Macon, in the county of Macon and State of Missouri, have invented certain new and useful Improvements in Corn-Harvesters, of which the following is a specification, reference being had to the accompanying drawings.

This invention relates to corn harvesters, and particularly to one having a cutting blade mounted upon a drag platform.

The object of the invention is to construct a harvester of this character with simple and efficient means for guiding the uncut corn stalks to the cutting blade, the construction causing the cut corn to fall upon the drag platform where it may be easily and quickly handled for forming shocks.

A further object of the invention is to provide a device of this character with a hingedly connected guide plate so that the bunched stalks will be held in a compact form and directed to the cutting blade during the travel of the machine until the corn is severed.

In the drawings Figure 1 is a top plan view of the harvester; Fig. 2 is a side elevation of the same; Fig. 3 is a longitudinal sectional view on the line 3—3 of Fig. 1; Fig. 4 is a rear elevation of the harvester.

Referring to the drawings, the numeral 1 designates a drag platform, the same being provided upon its under corners with runners 2. Rigidly connected to the rear end of the platform 1 is a brace bar 3 to the outer end of which is connected the rear end of a guide bar 4, said bar being arranged in oblique relation to one side of the platform 1, whereby a guide slot 5 is provided. Mounted upon the upper face of the platform 1 is a vertical standard 6 having secured thereto a laterally extending support 7, said standard being provided with a series of transversely and longitudinally arranged perforations designated 6' and 6'', respectively. The support 7 is provided with a plurality of vertical perforations 8, and a brace bar 8', the purpose of which will be hereinafter described. Hinged loosely to the forward end of the bar 4 is a hanger 9, the inner end of which is provided with alined perforations 10, through which a pin 11 is adapted to pass to engage any one of the perforations 8 formed in the support 7. A diagonally arranged angle iron support 12 is provided and has one of its ends supported upon the platform 1 and its other end resting upon the bar 4, said support being mounted upon bars 12' which are fixed to the platform. Rigidly connected to the angle iron support 12 is a blade 13, said blade being adapted to bridge the slot 5. Hingedly connected to the platform 1 adjacent one side thereof is a guide plate 14, the lateral movement of the same being limited by a strap iron member 15, to the upper end of which is connected a snap hook 15', which snaps into engagement with a staple 16 carried by the guide plate, the lower end of the member 15 being connected to the platform 1, whereby when the harvester is being moved in its cutting direction the corn stalks will be bunched to a certain extent and guided toward the cutting blade 13, the shock incidental to the stalks contacting with the sections forming the slot 5 being relieved by the hinged guide plate 14. The severed corn is directed upon the platform 1 by a guide hook 17 carried upon the hanger 9. It will be noted that the guide hook 17 engages the corn before the same is cut, so that the cut corn will be positively directed upon the platform. Pivotally connected to the upper surface of the hanger 9 is a finger 18 the free end of which normally engages the rear edge of the supplemental guide plate 14, so that corn will be held between the hook 17 and finger 18 when the harvester is at rest, the inward swinging movement of the finger 18 being limited by a stop pin 19 upon the hanger 9. Secured upon the forward end of the drag platform 1 is an obliquely disposed bar 20, the same being provided at its outer end with a stop 21, so that when the cut corn falls upon the platform it will be spaced therefrom, and may be easily handled and prevented from falling from the platform by the stop 21. A shock former 22 is provided and is adapted to be supported at its upper end by a pin 23, said pin being adapted to engage in a transverse perforation 25' formed in the extreme upper end of the standard 6. The shock former 22 is further provided with a series of alined perforations 24, in any one of which a pin 25 engages. The cut corn is guided by the hook 17 to the platform 1, and will fall upon the bar 20 and may be handled easily to surround the former 22 and tied thereto to form a shock, the pin 25 being embedded in the corn. Upon removal of the pin 25 the platform 1 is moved forward, the former 22 slips from the shock and is then ready to be used again.

Upon the harvester being moved across a field the standing corn is guided into the slot 5, and between the hanger 9 and guide plate 14, the hook 17 tending to bend the corn stalks previous to the cutting thereof by the blade 13, the cut corn being then in position to fall directly upon the platform 1, to be shocked.

It will be noted that by providing the hanger 9 with the perforations 10, the same may be adjusted to regulate the feed of the corn in the slot 5, and that the hanger 9 may be raised or lowered by moving the support 7 up or down upon the standard 6, the lower end of the brace rod 8′ and bolt 26 being adapted to engage in the respective perforations 6′ and 6″, so that the hanger may be adjusted when cutting tall corn stalks.

What I claim is:—

1. A corn harvester of the character described, including a platform, a guide bar secured to the platform in laterally spaced relation thereto, whereby a guide slot is formed between one side of the platform and said bar, a standard mounted upon the rear end of the platform, a hanger pivotally connected to the forward end of said bar and adjustably connected at its rear end to the standard, a guide plate mounted for laterally swinging movement on the platform adjoining one side of said guide slot, a guide hook secured to the hanger in the rear of the guide plate, a cutting blade secured to said guide bar and platform and bridging said slot and mounted at the rear of the guide hook, and a finger pivotally connected to the hanger and adapted to rest normally upon the rear edge of said guide plate.

2. A corn harvester of the character described, including a platform, a guide bar connected to the platform in laterally spaced relation thereto, whereby to form a guide slot at one side of the platform, a cutting blade bridging said slot, a guide plate mounted for laterally swinging movement on the platform adjoining one side of said slot, a vertical standard mounted upon the rear of the platform, a support secured to and extending laterally from said standard, a hanger, the forward end of which is hingedly connected to the forward end of the guide bar, the rear end of the hanger being adjustably connected to said support, and a hook carried by the hanger for guiding the cut corn upon the platform.

3. A corn harvester of the character described, including a platform, a guide bar connected to the platform in laterally spaced relation thereto, whereby to form a guide slot therewith, a cutting blade bridging said slot, a guide plate mounted upon the platform, a hanger connected to the guide bar and extending upwardly and rearwardly from its point of connection to said bar, a guide hook carried by said hanger, and a finger pivotally connected to said hanger and adapted to rest loosely upon the rear edge of said guide plate.

4. A corn harvester of the character described, including a platform, a guide bar connected thereto in laterally spaced relation therewith, whereby to form a guide slot, a standard mounted upon the platform and formed with a laterally disposed support, a hanger hingedly connected at its forward end to the forward end of the guide bar and adapted to be adjustably connected to said support, a blade bridging said slot, and a hook carried by the hanger.

5. A corn harvester of the character described, including a platform, a guide bar connected thereto in laterally spaced relation therewith, whereby to form a guide slot, a standard mounted upon the platform and formed with a laterally disposed support, a hanger hingedly connected at its forward end to the forward end of the guide bar and adapted to be adjustably connected to said support, a blade bridging said slot, a hook carried by the hanger, and a hinged guide plate mounted upon the platform adjoining one side of the guide slot and located in advance of said hook.

In testimony whereof I hereunto affix my signature in the presence of two witnesses.

EDSON HOWE.

Witnesses:
 OSWALD HICKS,
 BLANCHE E. McDONALD.

---

Copies of this patent may be obtained for five cents each, by addressing the "Commissioner of Patents, Washington, D. C."